United States Patent
Lee et al.

(10) Patent No.: US 6,845,371 B1
(45) Date of Patent: Jan. 18, 2005

(54) MULTIMEDIA DATA STRUCTURE REFLECTING CHANGE OF USER RELEVANCE FEEDBACK AND METHOD OF DETERMINING WEIGHTS OF IMAGE FEATURES OF MULTIMEDIA DATA

(75) Inventors: Jin Soo Lee, Seoul (KR); Hyeon Jun Kim, Kyounggi-do (KR); Hee Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 09/666,281

(22) Filed: Sep. 21, 2000

(30) Foreign Application Priority Data

Sep. 22, 1999  (KR) ........................................ 1999-41138

(51) Int. Cl.⁷ .............................................. G06F 17/30
(52) U.S. Cl. .................... 707/3; 707/2; 707/6; 709/217
(58) Field of Search ................. 707/6, 511, 2, 707/3, 10; 700/284; 355/68; 348/207.99; 382/107, 118; 250/201.9; 706/14, 15; 709/217

(56) References Cited

U.S. PATENT DOCUMENTS

| | | | | |
|---|---|---|---|---|
| 4,176,395 A | * | 11/1979 | Evelyn-Veere et al. | 700/284 |
| 5,281,995 A | * | 1/1994 | Terashita et al. | 355/68 |
| 5,579,471 A | * | 11/1996 | Barber et al. | 707/6 |
| 5,652,899 A | * | 7/1997 | Mays et al. | 707/511 |
| 5,748,231 A | * | 5/1998 | Park et al. | 348/207.99 |
| 6,067,539 A | * | 5/2000 | Cohen | 707/2 |
| 6,084,227 A | * | 7/2000 | Rhoads | 250/201.9 |
| 6,141,438 A | * | 10/2000 | Blanchester | 382/118 |
| 6,173,275 B1 | * | 1/2001 | Caid et al. | 706/14 |
| 6,292,575 B1 | * | 9/2001 | Bortolussi et al. | 382/107 |
| 6,304,864 B1 | * | 10/2001 | Liddy et al. | 706/15 |
| 6,347,313 B1 | * | 2/2002 | Ma et al. | 707/3 |
| 6,460,036 B1 | * | 10/2002 | Herz | 707/10 |

* cited by examiner

*Primary Examiner*—Charles Rones
*Assistant Examiner*—Tony Mahmoudi
(74) *Attorney, Agent, or Firm*—Fleshner & Kim, LLP

(57) ABSTRACT

A method of searching for images in a database system determines weights of desired image features by taking into consideration both recent user relevance feedback information and whole feedback information. The method is performed in accordance with a multimedia data structure which reflects user feedback change. According to one embodiment, the data structure includes information describing the features of a specific image, recent user feedback information when the weights of the features of the specific image are learned and determined by the user relevance feedback information, and whole feedback information when th weight of the features of the specific image are learned and determined by the user relevance feedback information. The weights of the image features are determined considering both the recent user feedback information and the whole feedback information, and the image features according to the determined weights are used for the image search.

20 Claims, 4 Drawing Sheets

| 401 | A<br>1 |        |        |        |        | <_ Input A |
|-----|--------|--------|--------|--------|--------|------------|
| 402 | B<br>1 | A<br>1 |        |        |        | <_ Input B |
| 403 | C<br>1 | B<br>1 | A<br>1 |        |        | <_ Input C |
| 404 | D<br>1 | C<br>1 | B<br>1 | A<br>1 |        | <_ Input D |
| 405 | E<br>1 | D<br>1 | C<br>1 | B<br>1 | A<br>1 | <_ Input E |
| 406 | E<br>1 | A<br>1 | D<br>1 | C<br>1 | B<br>1 | <_ Input A |

MULTIMEDIA DATA STRUCTURE REFLECTING CHANGE OF USER RELEVANCE FEEDBACK AND METHOD OF DETERMINING WEIGHTS OF IMAGE FEATURES OF MULTIMEDIA DATA

BACKGROUND OF THE INVENTION

1. Field of the Invention

The present invention relates to a method of determining weights of image features by considering both the recent user relevance feedback information and the whole feedback information in a system which determines the weights of the image features using the user relevance feedback, and a data structure therefor.

In particular, the present invention relates to a multimedia data structure and a method of determining weights of image features using the multimedia data structure which can reflect both the recent user relevance feedback information determined for a predetermined time period or by the predetermined number of frequency and the information on the whole user relevance feedback information till now when determining the weights of the image features in a multimedia search system which changes the weights of the image features based on the user relevance feedback if the user gives the feedback regarding a similarity with respect to a certain image and then uses the changed weights of the image features for the future search.

2. Description of the Related Art

Conventionally, in measuring the similarity between images for an effective image search, a method of determining the similarity by giving a weight for each feature, and a method of determining the similarity by giving a weight for each element in a feature are used.

Specifically, if the user gives feedback information on a similar image or an image not similar as he/she views images presented in response to a user's query, the system automatically calculates weights of respective features such as color histogram, texture histogram, dominant color, etc., using the feedback information, and uses the calculated weights for the image search.

Such learned weights may be stored in table, and used again for subsequent searches for other images.

Also, in case of searching an image having no weight given thereto, a previously learned weight of another similar type image may be used. For this, similar image group information is managed in a table.

Specifically, even when the current reference image has no weight given thereto, a search is performed with reference to a specified weight if any other image in the group, to which the reference image belongs, has such a weight.

In the image search reflecting the user relevance feedback as described above, the method using the learned weight through the user relevance feedback has an advantage that the weight is the value which reflects the whole feedback till now with respect to the image, but has a disadvantage that it cannot reflect the change of the recent feedback pattern when the recent user feedback pattern is changed.

For instance, if the corresponding image moves to another database, a feedback different from the feedback pattern that the user has reflected till now will be performed.

In this case, if lots of feedback are reflected as a predetermined time elapses after the database movement, the feedback pattern produced after the database movement will affect as more important information than the previously reflected feedback pattern.

However, the above-described weight learning method does not provide the result learned using only the feedback within a specified period, and thus it can hardly reflect the user feedback pattern recently changed in case that it has only the weight learning information according to the whole feedback as described above.

Meanwhile, in case of managing the similar image group information in list, all the feedback images cannot be managed in list since a large amount of storage space is required, and thus a limited list using only the recent feedback information can be managed.

In this case, the recent user feedback pattern can be reflected, but the whole feedback pattern cannot be reflected.

For instance, if the weight of the image feature is determined and learned only by the limited feedback for the latest period in the event that the recent user feedback is not in consistency, the characteristics of the corresponding image cannot be reflected, and the reliability of the image feature information greatly deteriorates due to the irregular feature weight learning.

SUMMARY OF THE INVENTION

Therefore, an object of the invention is to provide a multimedia data structure and a method of determining weights of image features which can determine the weights of the image features by considering both the recent user feedback pattern corresponding to a predetermined time period or the frequency number and the whole feedback pattern when the weight of the image feature is determined using the user relevance feedback.

Another object of the invention is to provide a multimedia data structure and a method of determining weights of image features which can determine the weights of the image features by considering both the recent user feedback information corresponding to a predetermined time period or its frequency and the whole feedback-information and in proportion to reliability information representing how reliable the recent user feedback information is, reliability information representing how reliable the whole feedback information is, and reliabilities of the two information, when the weights of the image features are determined using the user relevance feedback.

In accordance with the present invention, these objects are accomplished by providing a multimedia data structure reflecting change of a user relevance feedback in a system for determining weights of features used for an image search using the user relevance feedback, the multimedia data structure comprising:

(a) information describing the features of a certain image;

(b) recent user feedback information when weights of the features of the certain image are learned and determined by the user relevance feedback; and (c) whole feedback information when weights of the features of the certain image are learned and determined by the user relevance feedback;

(d) wherein the weights of the image features are determined considering both the recent user feedback information and the whole feedback information, and then used for search.

In accordance with the present invention, the recent feedback information and the whole feedback information are determined for a predetermined time period or by a frequency.

In accordance with the present invention, the recent feedback information is a weight value learned by the recent user feedback or the information of similar images feedback, and the whole feedback information is represented by a weight value learned by all the feedback given till now.

Preferably, the multimedia data structure further comprises recent user feedback reliability information representing how reliable the recent user feedback information is, and whole feedback reliability information representing how reliable the whole feedback information is, wherein the weight of the image feature is determined in proportion to reliabilities of the recent user feedback information, the whole feedback information, or both the recent and whole feedback information.

In another aspect of the present invention, there is provided a method of determining weights of image features using multimedia data reflecting a change of a user relevance feedback in a system for determining the weights of the features used for an image search by the user relevance feedback, the method comprising the steps of:

(a) providing a multimedia data structure including information describing the features of a certain image, recent and whole feedback information for the image, and reliability information of the respective feedback information;

(b) updating the feedback information and their reliabilities by learning them in response to the user feedback; and (c) determining the weights of the image features in proportion to reliabilities of the recent feedback information, the whole feedback information, or both the recent and the whole feedback information.

In accordance with the present invention, the recent feedback information is represented by a weight value learned by the recent user feedback or the information of feedback similar images which is a list form, and the whole feedback information is represented by a weight value learned by all the feedback given till now.

In accordance with the present invention, the reliability of the recent user feedback information is determined in proportion to a consistency of a recently used pattern or feedback.

In accordance with the present invention, the reliability of the whole feedback information is determined in proportion to the number of feedback concerned in learning.

Preferably, the recent user feedback information is represented by a similar image list, and a queue algorithm is used for reflecting the recent user feedback pattern by the similar image list.

In accordance with the present invention, the queue algorithm comprises the steps of:

(a) checking whether a similar multimedia object exists in a current queue when the corresponding object is fed back;

(b) if it is checked that the corresponding object does not exist in the current queue, inputting the corresponding object to an uppermost space of a queue entrance, setting the number of feedback of the corresponding object to "1", and shifting objects existing in the queue to lower positions by one space;

(c) if it is checked that the corresponding object exists in the current queue, increasing the number of feedback of the corresponding object, and shifting the objects existing in the queue to upper positions by "N"; and (d) if any object is shifted to the lower position over a size of the queue at the respective steps, deleting the corresponding object from the queue.

In the queue algorithm according to the present invention, "N" is fixed, or variably determined in accordance with the objects.

In the queue algorithm according to the present invention, "N" is varied in inverse proportion to the frequency of appearance of the object.

In the queue algorithm according to the present invention, if a similar multimedia object does not exist in the queue when the similar multimedia object is fed back, the object is inputted to the queue only in case that the object is fed back more than the specified threshold number.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Hereinafter, a multimedia data structure reflecting the change of the user, relevance feedback and a method of determining weights of image features using this multimedia data in accordance with the present invention will be described with respect to embodiments illustrated in the annexed drawings.

Figure 1:
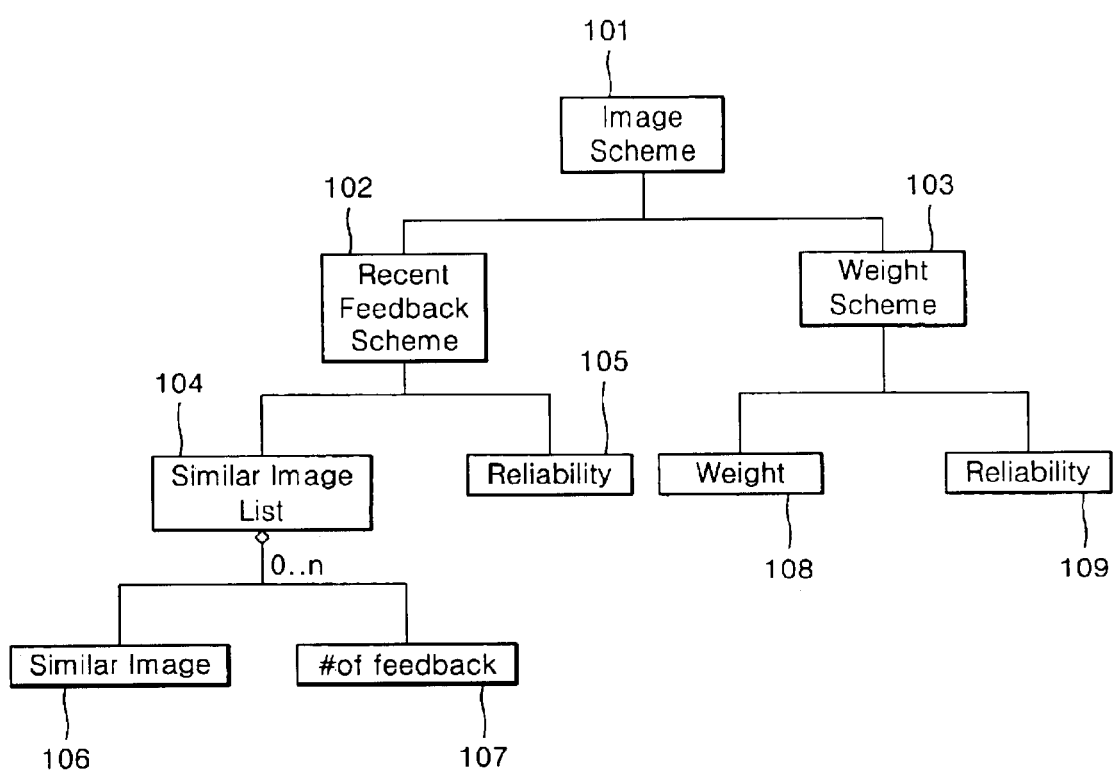
FIG. 1 is a view illustrating the image data structure according to the present invention.

FIG. 1 is a view illustrating the image data structure according to the present invention, and shows an example of the image data structure to which the technique for learning and determining the weights of the image features used for the image search according to the user relevance feedback.

Referring to FIG. 1, an image scheme 101 includes a recent feedback scheme 102 and a weight scheme 103.

The recent user feedback scheme 102 includes a similar image lest 104 constituted by the user feedback during the recent time (time period or frequency), and a reliability 105 representing how reliable the similar image list is.

The similar image list 104 is described by a similar image 106 and the number of feedback 107 for the image.

Specifically, the recently used image list is constituted by the feedback for the recent similar image, and an item in the list comprises the similar image 106 and the number of feedback for the similar image.

Meanwhile, the weight scheme 103 includes a weight 108 learned by all the user feedback till now and its reliability 109.

Referring to FIG. 1, the reliability for the recent user feedback can be calculated by the following equation 1.

$$1 - \frac{\left[\sum_{i=0}^{i=m}(N - n_i)\right]}{N} \quad \text{[Equation 1]}$$

where, N is the number of feedback, m is the number of images in the similar image list, and $n_i$ is the number of feedback given to the i-th image.

And, the reliability for the weight can be defined by the following equation 2.

$$Reliability = \sum_{k=1}^{n} e_k N_k \quad \text{[Equation 2]}$$

where, n is the number of authority levels, $e_k$ is an effective value of the authority level k ($e_1 > e_2 > \ldots > e_{n-1} > e_n$), and $N_k$ is the number of use by the authority level k.

In equation 2, n is the number of user authority levels (When the feedback is given by judging the similarity of the image, the reliability for an expert's feedback is much higher than that for a non-expert's feedback, and thus the authority for a specified user feedback to affect the weight of the feature is graded by level), $e_k$ is an effective value representing how much the user authority level affects the weight updating value, and $N_k$ is the number of feedback by the user authority level k (The user authority level becomes relatively high in case of the expert, and becomes low in case of a general user. In case that the user authority level is not considered, the reliability is in proportion to the number of feedback concerned in learning).

The weights of the features can be calculated using the recent user feedback scheme as described above. When the calculated weights and the weights represented in the whole information are combined, the weights of the respective information are used for the image search in proportion to the reliabilities obtained as above.

In the multimedia data structure of FIG. 1, the recent feedback scheme 102 is represented as the similar image list. However, this can be represented as the feature weight value learned by the recent user feedback just like the weight scheme 103.

Meanwhile, the recent user feedback scheme (or recent use pattern) is represented as information by the user pattern or feedback given for a predetermined time period, or as information by the user pattern or feedback given within a recent predetermined frequency.

For instance, the recent user feedback scheme is represented as the information fed back for the corresponding image within a time period d between the current time point and a certain time point of the past as the previous images which have passed the time period d are deleted, or as the recent information represented by the images whose number of feedback is less than the predetermined threshold number, so that the change of the recent user feedback (pattern) can be reflected.

That is, a consistent user feedback pattern change can be considered by eliminating an intermittent or irregular user feedback and minimizing its influence.

Specifically, by considering the reliabilities of the respective information expressed by the equation 1 or equation 2, the weights of the image features are determined in proportion to the reliabilities of the recent information, whole information, or both the recent and the whole information, so that the change of the user feedback can be sufficiently reflected.

Also, the weights of the image features are determined in a manner that the reliability of the recent information is in proportion to the consistency of the recent use pattern or feedback, and the reliability of the whole information is in proportion to the number of feedback concerned by learning, so that the multimedia object search becomes possible considering both the whole feedback information and the recent feedback information.

Figure 2:
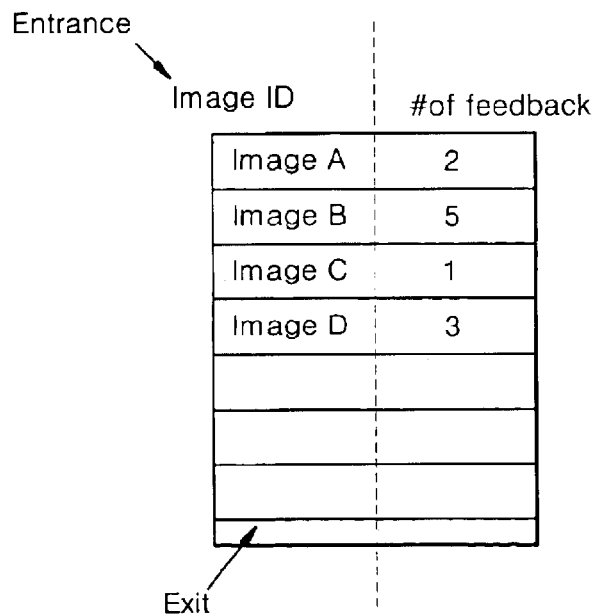
FIG. 2 is a view illustrating the queue structure for producing a similar image list according to the present invention.

FIG. 2 is a view illustrating the queue structure for producing the similar image list reflecting only the recent feedback in the multimedia structure of FIG. 1.

In the queue structure, an image identification (ID) for representing a specified image (i.e., similar feedback image) and the number of feedback for the corresponding image are recorded. Its entrance is on the upper position, and its exit is on the lower position.

Figure 3:
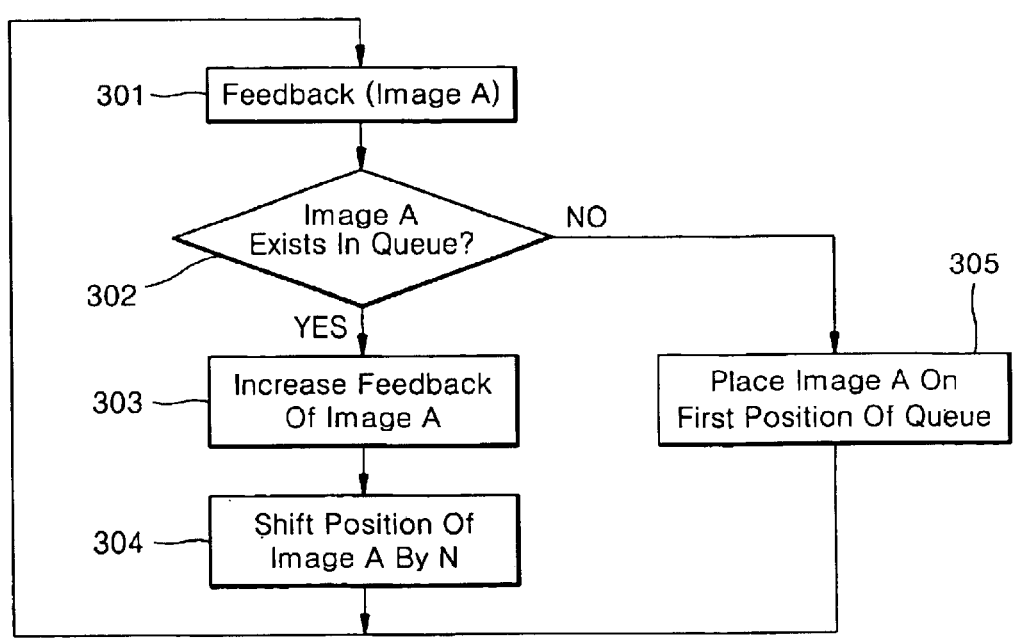
FIG. 3 is a flowchart explaining the similar image list managing method using the queue structure of FIG. 2.

FIG. 3 is a flowchart explaining the method of managing the similar image list reflecting only the recent user feedback using the queue structure of FIG. 2.

Referring to FIG. 3, the user feedback image A is received at step 301, and it is checked whether the image A exists in the queue of FIG. 3.

If it is checked that the input image A is in the queue at present, the feedback number of the image A is increased at step 303, and then the position of the image A is shifted to the entrance of the queue by "N" at step 304.

If it is checked that the input image A is not in the queue, the image A is positioned on the first (uppermost) position of the queue.

The above-described process is repeated, resulting in that if the image already existing in the queue is not used for feedback quite a while, it is continuously shifted to the lower position by a new feedback, and then automatically deleted from the queue when it passes over the limited size of the queue. In other words, a newly inputted image is always positioned on the entrance side of the queue, and thus the recent user feedback information (similar image list and the number of feedback for the respective image) can be always provided.

Figures 4, 5:
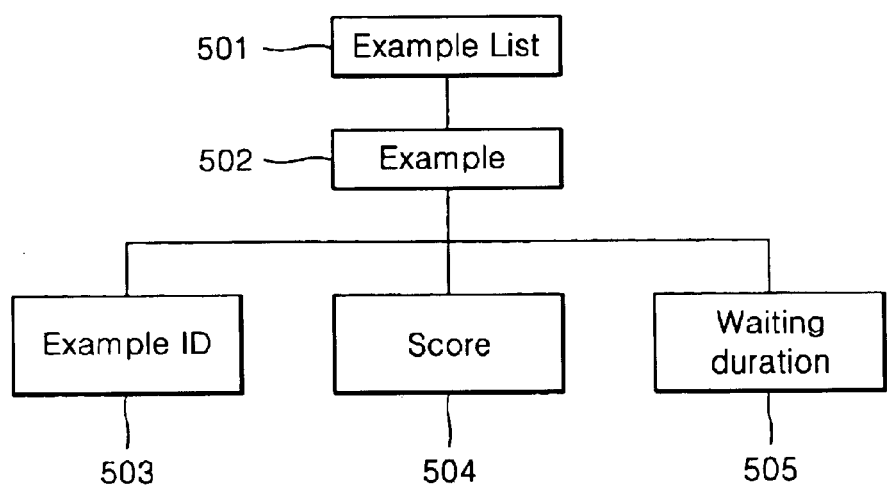
FIG. 4 is a view exemplifying the change of contents of the queue in the process of FIG. 3.
FIG. 5 is a view illustrating the list structure for producing the similar image list reflecting only the recent feedback in the multimedia data structure of FIG. 1.

FIG. 4 shows an example where the contents of the queue is changed for the understanding of the process of FIG. 3. In FIG. 3, N is fixed to 3, and the size of the queue is 10.

When the images A, B, C, D, and E are sequentially inputted, the contents of the queue has the form of steps 401 to 405.

Thereafter, if the image A is fed back at step 406, the feedback number of the image A increases to 2, and its position is shifted to the queue entrance (uppermost) side by N=3.

Here, N may be a fixed value, or may be varied according to the multimedia object. For instance, it may be varied in inverse proportion to the appearance frequency of the object.

Specifically, if the probability that a certain multimedia object is included and appears as the feedback candidate before the user determined the feedback is always ½ in comparison to other objects, N for this object becomes double in comparison to other objects.

Also, the recent information (i.e., a similar image list information) can be managed in a manner that if a similar multimedia object does not exist in the queue when the object is fed back, the object is unconditionally inputted to the first space on the queue entrance, the number of feedback of the corresponding object is set as 1, and the current feedback object is inputted in the queue only when the object is fed back over the specified threshold number.

This can prevent the intermittent feedback from being reflected as it is.

FIG. 5 shows another list structure for producing the similar image list reflecting only the recent feedback in the multimedia data structure of FIG. 1.

Referring to FIG. 5, an image example 502 included in an image example list 501 is composed of its example ID 503, a score 504 of the feedback similar image, and a waiting duration 505 representing a time period between the final feedback time and the present time.

Here, the waiting duration is determined as '0' when the feedback is received, and increases by '1' whenever every day (or every time or every month) has passed or whenever a certain feedback arrives.

The method of managing the score using such information updates the image score in the image list whenever the feedback arrives by the following calculation.

(a) With respect to the image fed back from the similar images:

Score(new)=Score(current)×$fW$(Waiting Duration)+1

(b) With respect to other images not fed back:

Score(new)=Score(current)×$fW$(Waiting Duration)

Figure 6:
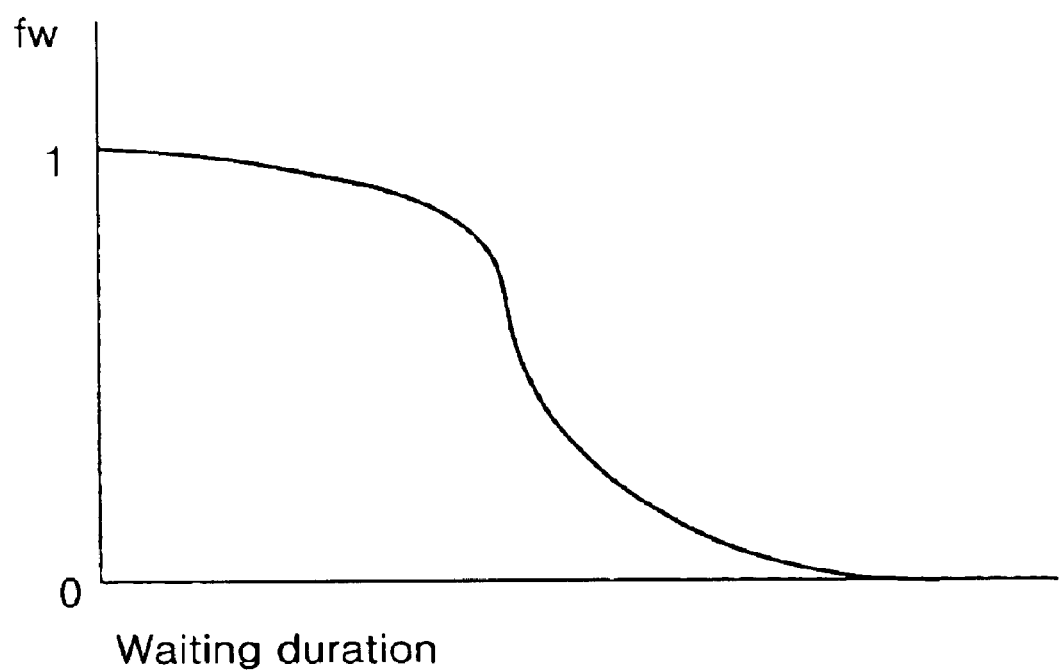
FIG. 6 is a view illustrating the score updating method 25 applied to the list structure of FIG. 5.

At this time, fW( ) is a function having the characteristic that it returns smaller value as the waiting duration becomes larger. FIG. 6 shows an example of such a function.

According to the above-described method, the similar image not fed back quite a while returns a very small value by fW, and it has a small score even if it recorded a large score.

In the image list, only images over the predetermined threshold number on the basis of such a score may be managed by list, or only the upper N images may be managed by list.

As described above, according to the present invention, the recent user feedback (pattern) change is reflected considering both the recent user pattern (feedback information) and the whole feedback information when the image search is performed by learning and using the feature weight by the user relevance feedback, and thus the image search which accurately reflects the user's intention becomes possible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multimedia data structure embodied in a computer readable medium and used for an image search comprising:
   information describing at least one feature of a certain image;
   recent user feedback information based on user relevance feedback;
   whole feedback information based on the user relevance feedback obtained since formation of the data structure, wherein the recent user feedback information is represented as a similar image list, and the similar image list has an image list structure which includes a similar image identification, a score reflecting the current feedback, and a waiting duration representing a time period between a final feedback time point and a present time point.

2. A similar image list managing method for the multimedia data structure recited in claim 1, comprising:
   managing a similar image list in a manner that only images whose scores are over a predetermined threshold number are maintained in the list, or only images whose scores are on N upper positions of the list if a size of the list is N.

3. A feedback reflecting score updating method for the multimedia structure recited in claim 1, comprising updating image scores in a manner that
   (a) with respect to image fed back from similar images, a following calculation is performed: Score (new)=Score (current)×fW (Waiting Duration)+1; and
   (b) with respect to other images not fed back, a following calculation is performed: Score (new)=Score (current)× fW (Waiting Duration); and wherein fW (Waiting Duration) is a function having a characteristic that it returns smaller values as the waiting duration becomes longer.

4. A multimedia data structure embodied in a computer readable medium and reflecting change of a user relevance feedback for determining weights of image features used for an image search, comprising:
   (a) information describing at least one feature of a certain image;
   (b) recent user feedback information based on user relevance feedback;
   (c) whole feedback information based on the user relevance feedback obtained since formation of the data structure; and
   (d) reliability information indicating reliability of at least one of the user feedback information and whole feedback information, wherein the recent user feedback information is represented as a similar image list, and the similar image list has an image list structure which includes a similar image identification, a score reflecting the current feedback, and a waiting duration representing a time period between a final feedback time point and a present time point.

5. The multimedia data structure of claim 4, wherein the reliability information indicates reliability of both of the user feedback information and the whole feedback information.

6. A multimedia data structure embodied in a computer readable medium and used for an image search, comprising:
   (a) information describing at least one feature of a certain image;
   (b) recent user feedback information based on user relevance feedback;
   (c) whole feedback information based on the user relevance feedback obtained since formation of the data structure;
   recent user feedback reliability information representing how reliable the recent user feedback information is; and
   whole feedback reliability information representing how reliable the whole feedback information is, wherein the recent user feedback reliability information is expressed by $$1 - \frac{\left[\sum_{i=0}^{i=m}(N-n_i)\right]}{N}$$

where, N is a number of user feedback responses, m is a number of images in a similar image list, and $n_i$ is a number of user feedback responses given to the i-th image.

7. The multimedia data structure as claimed in claim 1, wherein the recent user feedback information is determined for a predetermined time period or by a predetermined frequency.

8. The multimedia data structure as claimed in claim 1, wherein the recent user feedback information includes a weight value learned by the user relevance feedback or similar image information, and the whole feedback information is represented by a weight value learned by the user relevance feedback given since formation of the data structure.

9. The multimedia data structure as claimed in claim 1, wherein the recent user feedback information and whole feedback information provide an indication of relevance of the information describing the at least one feature of the certain image.

10. The multimedia data structure of claim 1, wherein the at least one feature includes at least one of a color histogram, a texture histogram, and a dominant color of the image.

11. The multimedia data structure of claim 1, wherein the information provides a statistical description of the image.

12. A method of determining weights of image features used for an image search based on user relevance feedback, comprising:

(a) providing a multimedia data structure including information describing the features of a certain image, recent user feedback information for the image, and whole feedback information for the image based on user relevance feedback obtained since formation of the data structure, and reliability information corresponding to the recent user feedback information and whole feedback information;

(b) updating the recent user feedback information and whole feedback information and their reliabilities by learning them in response to the user relevance feedback;

(c) determining weights of the image features in proportion to the reliabilities of the recent feedback information, the whole feedback information, or both the recent feedback information and the whole feedback information; wherein the reliability of the recent user feedback information is expressed by $$1 - \frac{\left[\sum_{i=0}^{i=m}(N - n_i)\right]}{N}$$

where, N is a number of user feedback responses, m is a number of images in a similar image list, and $n_i$ is a number of user feedback responses given to the i-th image.

13. The method as claimed in claim 12, wherein the recent user feedback information is represented by a weight value learned by the user relevance feedback or a similar image information, and the whole feedback information is represented by a weight value learned by feedback given since formation of the data structure.

14. The method as claimed in claim 12, wherein the reliability of the recent user feedback information is determined in proportion to a consistency of a recently used pattern or feedback.

15. The method as claimed in claim 12, wherein the reliability of the whole feedback information is determined in proportion to a number of feedback responses concerned in learning.

16. The method as claimed in claim 12, wherein the reliability of the whole feedback information is responsive to recorded user usage records wherein the recorded user usage records provide feedback to the reliability of the whole feedback information without user interaction.

17. A method of managing image information for an image search, comprising:

forming a data structure which includes information describing features of a certain image, recent user feedback information, and whole feedback information; and determining weights for the features of the certain image based on the recent user feedback information and the whole feedback information, wherein the method further comprises:

representing the recent user feedback information by a similar image list, and reflecting a recent user feedback pattern based by the similar image list using a queue algorithm, and wherein the queue algorithm comprises:

(a) checking whether a similar image exists in a current queue when the similar image is fed back;

(b) if it is checked that the similar image does not exist in the current queue, inputting the similar image to an uppermost space of a queue entrance, setting a number of feedback responses of the similar image to "1", and shifting images existing in the queue to lower positions by one space;

(c) if it is checked that the similar image exists in the current queue, increasing the number of feedback responses of the similar image, and shifting other images in the queue to upper positions by "N"; and (d) if any image is shifted to a lower position over a size of the queue at the respective steps, deleting the image shifted to the lower position from the queue.

18. The method as claimed in claim 17, wherein "N" is fixed or variably determined in accordance with the similar image.

19. The method as claimed in claim 17, wherein "N" is varied in inverse proportion to a frequency of appearance of the similar image.

20. The method as claimed in claim 17, wherein if the similar image does not exist in the queue when the similar image is fed back, the similar image is inputted to the queue only in case that the similar image is fed back more than a specified threshold number.

* * * * *